United States Patent
Rielly et al.

(10) Patent No.: US 7,822,684 B2
(45) Date of Patent: Oct. 26, 2010

(54) PERSONALIZED BANK TELLER MACHINE

(75) Inventors: William S. Rielly, Dublin, OH (US);
Leslie D. Erlich, New York, NY (US);
Ravi Acharya, Philadelphia, PA (US);
Dmitry Goldman, Brooklyn, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 225 days.

(21) Appl. No.: 11/185,847

(22) Filed: Jul. 21, 2005

(65) Prior Publication Data

US 2006/0038004 A1 Feb. 23, 2006

Related U.S. Application Data

(63) Continuation-in-part of application No. 10/266,838, filed on Oct. 7, 2002.

(60) Provisional application No. 60/327,517, filed on Oct. 5, 2001.

(51) Int. Cl.
*G06Q 40/00* (2006.01)
(52) U.S. Cl. .................................. 705/43; 235/379
(58) Field of Classification Search .............. 705/1, 705/16, 34–44; 709/316, 330; 380/24
See application file for complete search history.

(56) References Cited

U.S. PATENT DOCUMENTS

| | | | |
|---|---|---|---|
| 3,653,480 | A | 4/1972 | Yamamoto et al. |
| 4,205,780 | A | 6/1980 | Burns |
| 4,321,672 | A | 3/1982 | Braun et al. |
| 4,396,985 | A | 8/1983 | Ohara |
| 4,495,018 | A | 1/1985 | Vohrer |
| 4,617,457 | A | 10/1986 | Myers |

(Continued)

FOREIGN PATENT DOCUMENTS

EP 0099999 7/1983

(Continued)

OTHER PUBLICATIONS

Norwest bank Iowa staff, Community reinvestment act performance evaluation; Administrator of National banks, pp. 1-15.*

(Continued)

*Primary Examiner*—Mary Cheung
*Assistant Examiner*—Marissa Liu
(74) *Attorney, Agent, or Firm*—Hunton & Williams LLP

(57) ABSTRACT

A system and method is provided for an ATM having a display, a logic server coupled to the display, and a memory coupled to the logic server. The logic server dynamically controls the functions available to the users including messages and coupons. A host contains a profile of a user. The memory, which is accessible to the logic server, may contain a profile of at least one user. A user card may contain a profile of the user. In operation, the ATM detects the a user's card and requests the profile of the user whose card was detected from a host. The ATM then receives the user's profile and stores the user's profile in the ATM. The system and method also provides a cardless ATM in which a user logs on without a card. Additionally, system and method also provides ATM services via a personal device.

19 Claims, 14 Drawing Sheets

U.S. PATENT DOCUMENTS

| | | | |
|---|---|---|---|
| 4,672,377 A | 6/1987 | Murphy | |
| 4,700,055 A | 10/1987 | Kashkashian, Jr. | |
| 4,752,877 A | 6/1988 | Roberts et al. | |
| 4,797,913 A | 1/1989 | Kaplan | |
| 4,799,156 A | 1/1989 | Shavit | |
| 4,812,628 A | 3/1989 | Boston | |
| 4,823,264 A | 4/1989 | Deming | |
| 4,931,793 A | 6/1990 | Fuhrmann et al. | |
| 4,948,174 A | 8/1990 | Thomson et al. | |
| 4,974,878 A | 12/1990 | Josephson | |
| 4,988,849 A | 1/1991 | Sasaki | |
| 4,992,646 A | 2/1991 | Collin | |
| 5,023,904 A | 6/1991 | Kaplan | |
| 5,053,607 A | 10/1991 | Carlson | |
| 5,054,096 A | 10/1991 | Beizer | |
| 5,080,748 A | 1/1992 | Bonomi | |
| 5,111,395 A | 5/1992 | Smith | |
| 5,121,945 A | 6/1992 | Thomson et al. | |
| 5,122,950 A | 6/1992 | Mee | |
| 5,136,502 A | 8/1992 | Van Remortel et al. | |
| 5,175,682 A | 12/1992 | Higashiyama | |
| 5,198,975 A | 3/1993 | Baker et al. | |
| 5,220,501 A | 6/1993 | Lawlor | |
| 5,225,978 A | 7/1993 | Peterson | |
| 5,237,159 A | 8/1993 | Stephens | |
| 5,283,829 A | 2/1994 | Anderson | |
| 5,287,269 A | 2/1994 | Dorrough et al. | |
| 5,311,594 A | 5/1994 | Penzias | |
| 5,315,508 A | 5/1994 | Bain et al. | |
| 5,321,238 A | 6/1994 | Watanabe | |
| 5,326,959 A | 7/1994 | Perazza | |
| 5,336,870 A | 8/1994 | Hughes | |
| 5,343,529 A | 8/1994 | Goldfine et al. | |
| 5,350,906 A | 9/1994 | Brody et al. | |
| 5,367,581 A | 11/1994 | VanHorn | |
| 5,373,550 A | 12/1994 | Campbell | |
| 5,396,417 A | 3/1995 | Burks | |
| 5,402,474 A | 3/1995 | Miller | |
| 5,412,190 A | 5/1995 | Kopesec | |
| 5,424,938 A | 6/1995 | Wagner | |
| 5,430,644 A | 7/1995 | Deaton et al. | |
| 5,432,506 A | 7/1995 | Chapman | |
| 5,444,794 A | 8/1995 | Uhland | |
| 5,444,841 A | 8/1995 | Glaser et al. | |
| 5,446,740 A | 8/1995 | Yien | |
| 5,448,471 A | 9/1995 | Deaton et al. | |
| 5,465,206 A | 11/1995 | Hilt et al. | |
| 5,477,040 A | 12/1995 | Lalonde | |
| 5,479,494 A | 12/1995 | Clitherow | |
| 5,483,445 A | 1/1996 | Pickering | |
| 5,484,988 A | 1/1996 | Hills | |
| 5,502,576 A | 3/1996 | Ramsay et al. | |
| 5,504,677 A | 4/1996 | Pollin | |
| 5,506,691 A | 4/1996 | Bednar et al. | |
| 5,513,250 A | 4/1996 | McAllister | |
| 5,532,464 A | 7/1996 | Josephson et al. | |
| 5,544,046 A | 8/1996 | Niwa | |
| 5,550,734 A | 8/1996 | Tater | |
| 5,551,021 A | 8/1996 | Harada | |
| 5,557,515 A | 9/1996 | Abbruzzese et al. | |
| 5,563,400 A | 10/1996 | Le Roux | |
| 5,566,330 A | 10/1996 | Sheffield | |
| 5,568,489 A | 10/1996 | Yien | |
| 5,570,465 A | 10/1996 | Tsakanikas | |
| 5,572,004 A | 11/1996 | Raimann | |
| 5,583,759 A | 12/1996 | Geer | |
| 5,583,760 A | 12/1996 | Klesse | |
| 5,590,196 A | 12/1996 | Moreau | |
| 5,590,197 A | 12/1996 | Chen | |
| 5,592,377 A | 1/1997 | Lipkin | |
| 5,592,378 A | 1/1997 | Cameron | |
| 5,599,528 A | 2/1997 | Igaki | |
| 5,603,025 A | 2/1997 | Tabb | |
| 5,615,109 A | 3/1997 | Eder | |
| 5,619,558 A * | 4/1997 | Jheeta | 235/379 |
| 5,621,201 A | 4/1997 | Langhans | |
| 5,640,577 A | 6/1997 | Scharmer | |
| 5,642,419 A | 6/1997 | Rosen | |
| 5,649,117 A | 7/1997 | Landry | |
| 5,650,604 A | 7/1997 | Marcous et al. | |
| 5,652,786 A | 7/1997 | Rogers | |
| 5,659,165 A | 8/1997 | Jennings | |
| 5,659,469 A | 8/1997 | Deaton et al. | |
| 5,659,741 A | 8/1997 | Eberhardt | |
| 5,666,493 A | 9/1997 | Wojcik et al. | |
| 5,677,955 A | 10/1997 | Doggett et al. | |
| 5,679,938 A | 10/1997 | Templeton | |
| 5,679,940 A | 10/1997 | Templeton | |
| 5,692,132 A | 11/1997 | Hogan | |
| 5,699,528 A | 12/1997 | Hogan | |
| 5,703,344 A | 12/1997 | Bezy et al. | |
| 5,704,044 A | 12/1997 | Tarter et al. | |
| 5,708,422 A | 1/1998 | Blonder et al. | |
| 5,715,298 A | 2/1998 | Rogers | |
| 5,715,314 A | 2/1998 | Payne | |
| 5,715,399 A | 2/1998 | Bezos | |
| 5,717,989 A | 2/1998 | Tozzoli et al. | |
| 5,724,424 A | 3/1998 | Gifford | |
| 5,727,249 A | 3/1998 | Powell | |
| 5,748,780 A | 5/1998 | Stolfo | |
| 5,751,842 A | 5/1998 | Eccles | |
| 5,757,917 A | 5/1998 | Rose et al. | |
| 5,770,843 A | 6/1998 | Rose et al. | |
| 5,774,553 A | 6/1998 | Rosen | |
| 5,784,696 A | 7/1998 | Melnikof | |
| 5,793,861 A | 8/1998 | Haigh | |
| 5,794,221 A | 8/1998 | Egendorf | |
| 5,802,498 A | 9/1998 | Comesanas | |
| 5,802,499 A | 9/1998 | Sampson et al. | |
| 5,819,236 A | 10/1998 | Josephson | |
| 5,819,238 A | 10/1998 | Fernholz | |
| 5,826,241 A | 10/1998 | Stein | |
| 5,826,245 A | 10/1998 | Sandberg-Diment | |
| 5,832,447 A | 11/1998 | Rieker | |
| 5,832,460 A | 11/1998 | Bednar | |
| 5,832,463 A | 11/1998 | Houvener et al. | |
| 5,832,464 A | 11/1998 | Houvener et al. | |
| 5,832,488 A | 11/1998 | Eberhardt | |
| 5,835,580 A | 11/1998 | Fraser | |
| 5,835,603 A | 11/1998 | Coutts | |
| 5,835,899 A | 11/1998 | Rose et al. | |
| 5,852,812 A | 12/1998 | Reeder | |
| 5,859,419 A | 1/1999 | Wynn | |
| 5,864,609 A | 1/1999 | Cross et al. | |
| 5,870,456 A | 2/1999 | Rogers | |
| 5,870,721 A | 2/1999 | Norris | |
| 5,870,723 A | 2/1999 | Pare | |
| 5,870,725 A | 2/1999 | Bellnger et al. | |
| 5,873,072 A | 2/1999 | Kight | |
| 5,883,810 A | 3/1999 | Franklin et al. | |
| 5,884,288 A | 3/1999 | Chang | |
| 5,897,625 A | 4/1999 | Gustin | |
| 5,898,157 A | 4/1999 | Mangili et al. | |
| 5,903,881 A | 5/1999 | Schrader | |
| 5,910,896 A | 6/1999 | Hahn-Carlson | |
| 5,910,988 A | 6/1999 | Ballard | |
| 5,915,246 A * | 6/1999 | Patterson et al. | 705/43 |
| 5,917,965 A | 6/1999 | Cahill et al. | |
| 5,920,847 A | 7/1999 | Kolling et al. | |
| 5,930,778 A | 7/1999 | Geer | |
| 5,937,396 A | 8/1999 | Konya | |
| 5,940,811 A | 8/1999 | Norris | |
| 5,940,844 A | 8/1999 | Cahill et al. | |
| 5,943,656 A | 8/1999 | Crooks | |

| | | | | | |
|---|---|---|---|---|---|
| 5,945,653 A | 8/1999 | Walker et al. | 6,236,972 B1 | 5/2001 | Shkedy |
| 5,956,700 A | 9/1999 | Landry | 6,240,444 B1 | 5/2001 | Fin et al. |
| 5,963,647 A | 10/1999 | Downing et al. | 6,278,981 B1 | 8/2001 | Dembo et al. |
| 5,963,659 A | 10/1999 | Cahill et al. | 6,289,322 B1 | 9/2001 | Kitchen et al. |
| 5,963,925 A | 10/1999 | Kolling et al. | 6,301,379 B1 | 10/2001 | Thompson et al. |
| 5,966,698 A | 10/1999 | Pollin | 6,304,858 B1 | 10/2001 | Mosler et al. |
| 5,978,780 A | 11/1999 | Watson | 6,321,212 B1 | 11/2001 | Lange |
| 5,987,435 A | 11/1999 | Weiss et al. | 6,336,148 B1 * | 1/2002 | Doong et al. ............... 719/316 |
| 5,987,436 A | 11/1999 | Halbrook | 6,338,047 B1 | 1/2002 | Wallman |
| 5,987,439 A | 11/1999 | Gustin et al. | 6,338,049 B1 | 1/2002 | Walker et al. |
| 5,991,750 A | 11/1999 | Watson | 6,366,967 B1 * | 4/2002 | Wagner ...................... 710/33 |
| 6,000,832 A | 12/1999 | Franklin et al. | 6,374,235 B1 | 4/2002 | Chen et al. |
| 6,002,767 A * | 12/1999 | Kramer ...................... 705/79 | 6,393,409 B2 | 5/2002 | Young et al. |
| 6,003,762 A | 12/1999 | Hayashida | 6,405,173 B1 | 6/2002 | Honarvar et al. |
| 6,006,208 A | 12/1999 | Forst et al. | 6,415,259 B1 | 7/2002 | Wolfinger et al. |
| 6,009,442 A | 12/1999 | Chen et al. | 6,418,419 B1 | 7/2002 | Nieboer et al. |
| 6,014,636 A | 1/2000 | Reeder | 6,418,420 B1 | 7/2002 | DiGiorgio et al. |
| 6,016,482 A | 1/2000 | Molinari et al. | 6,418,430 B1 | 7/2002 | DeFazio et al. |
| 6,029,139 A | 2/2000 | Cunningham et al. | 6,488,203 B1 | 12/2002 | Stoutenburg et al. |
| 6,032,133 A | 2/2000 | Hilt et al. | 6,490,568 B1 | 12/2002 | Omara et al. |
| 6,032,137 A | 2/2000 | Hallard | 6,493,685 B1 | 12/2002 | Ensel et al. |
| 6,035,281 A | 3/2000 | Crosskey et al. | 6,502,747 B1 | 1/2003 | Stoutenburg et al. |
| 6,035,285 A | 3/2000 | Schlect et al. | 6,536,663 B1 * | 3/2003 | Lozier et al. ................ 235/379 |
| 6,035,287 A | 3/2000 | Stallaert et al. | 6,554,184 B1 | 4/2003 | Amos |
| 6,038,553 A | 3/2000 | Hyde, Jr. | 6,574,377 B1 | 6/2003 | Cahill et al. |
| 6,041,312 A | 3/2000 | Bickerton et al. | 6,578,015 B1 | 6/2003 | Haseltine et al. |
| 6,041,315 A | 3/2000 | Pollin | 6,609,113 B1 | 8/2003 | O'Leary et al. |
| 6,044,362 A | 3/2000 | Neely | 6,609,125 B1 | 8/2003 | Layne et al. |
| 6,045,039 A * | 4/2000 | Stinson et al. ............... 235/379 | 6,629,081 B1 | 9/2003 | Cornelius et al. |
| 6,047,261 A * | 4/2000 | Siefert ........................ 705/11 | 6,704,714 B1 | 3/2004 | O'Leary et al. |
| 6,052,674 A | 4/2000 | Zervides et al. | 6,721,715 B2 | 4/2004 | Nemzow |
| 6,058,380 A | 5/2000 | Anderson et al. | 6,736,314 B2 | 5/2004 | Cooper et al. |
| 6,058,381 A | 5/2000 | Nelson | 6,761,309 B2 | 7/2004 | Stoutenburg et al. |
| 6,061,665 A | 5/2000 | Bahreman | 6,769,605 B1 | 8/2004 | Magness |
| 6,065,675 A | 5/2000 | Teicher | 7,070,094 B2 | 7/2006 | Stoutenburg et al. |
| 6,067,524 A | 5/2000 | Byerly et al. | 7,376,622 B1 * | 5/2008 | Padalino et al. ............. 705/42 |
| 6,070,150 A | 5/2000 | Remington et al. | 7,424,970 B2 | 9/2008 | Royce-Winston et al. |
| 6,070,798 A | 6/2000 | Nethery | 7,606,734 B2 | 10/2009 | Baig et al. |
| 6,073,104 A | 6/2000 | Field | 7,610,222 B2 | 10/2009 | Neofytides et al. |
| 6,073,113 A | 6/2000 | Guinan | 7,617,157 B2 | 11/2009 | Seifert et al. |
| 6,076,072 A | 6/2000 | Libman | 2001/0018739 A1 | 8/2001 | Anderson et al. |
| 6,078,907 A | 6/2000 | Lamm | 2001/0037300 A1 * | 11/2001 | Miyazaki et al. ............. 705/43 |
| 6,081,790 A | 6/2000 | Rosen | 2001/0037309 A1 | 11/2001 | Vrain |
| 6,085,168 A | 7/2000 | Mori et al. | 2001/0044747 A1 * | 11/2001 | Ramachandran et al. ...... 705/16 |
| 6,088,683 A | 7/2000 | Jalili | 2001/0047334 A1 | 11/2001 | Nappe et al. |
| 6,088,685 A | 7/2000 | Kiron et al. | 2001/0047489 A1 | 11/2001 | Ito et al. |
| 6,088,686 A | 7/2000 | Walker et al. | 2001/0051533 A1 * | 12/2001 | Wietzke et al. ............. 455/564 |
| 6,092,056 A | 7/2000 | Tull, Jr. et al. | 2002/0012445 A1 | 1/2002 | Perry |
| 6,098,053 A | 8/2000 | Slater | 2002/0013728 A1 | 1/2002 | Wilkman |
| 6,098,070 A | 8/2000 | Maxwell | 2002/0026394 A1 | 2/2002 | Savage et al. |
| 6,105,011 A | 8/2000 | Morrison, Jr. | 2002/0038363 A1 | 3/2002 | MacLean |
| 6,108,639 A | 8/2000 | Walker et al. | 2002/0052842 A1 | 5/2002 | Schuba et al. |
| 6,110,044 A | 8/2000 | Stern | 2002/0069134 A1 | 6/2002 | Solomon |
| 6,111,858 A | 8/2000 | Greaves et al. | 2002/0077978 A1 | 6/2002 | O'Leary et al. |
| 6,115,690 A | 9/2000 | Wong | 2002/0087462 A1 | 7/2002 | Seifert et al. |
| 6,119,106 A | 9/2000 | Mersky et al. | 2002/0087468 A1 | 7/2002 | Ganesan et al. |
| 6,119,107 A | 9/2000 | Polk | 2002/0091635 A1 | 7/2002 | Dilip et al. |
| 6,125,354 A | 9/2000 | MacFarlane et al. | 2002/0107770 A1 | 8/2002 | Meyer et al. |
| 6,128,602 A | 10/2000 | Northington et al. | 2002/0107788 A1 | 8/2002 | Cunningham |
| 6,128,603 A | 10/2000 | Dent et al. | 2002/0111837 A1 | 8/2002 | Aupperle |
| 6,129,273 A | 10/2000 | Shah | 2002/0138398 A1 | 9/2002 | Kalin et al. |
| 6,138,118 A | 10/2000 | Koppstein et al. | 2002/0138432 A1 * | 9/2002 | Makino et al. ................ 705/43 |
| 6,144,946 A | 11/2000 | Iwamura | 2002/0170966 A1 | 11/2002 | Hannigan et al. |
| 6,148,293 A | 11/2000 | King | 2002/0178071 A1 | 11/2002 | Walker et al. |
| 6,149,056 A | 11/2000 | Stinson et al. | 2002/0194096 A1 | 12/2002 | Falcone et al. |
| 6,173,272 B1 | 1/2001 | Thomas et al. | 2002/0195486 A1 | 12/2002 | Erb et al. |
| 6,181,837 B1 | 1/2001 | Cahill et al. | 2002/0198817 A1 | 12/2002 | Dhir |
| 6,185,544 B1 | 2/2001 | Sakamoto et al. | 2002/0199182 A1 | 12/2002 | Whitehead |
| 6,202,054 B1 | 3/2001 | Lawlor et al. | 2003/0018557 A1 | 1/2003 | Gilbert et al. |
| 6,205,433 B1 | 3/2001 | Boesch et al. | 2003/0040959 A1 * | 2/2003 | Fei et al. ...................... 705/14 |
| 6,213,391 B1 * | 4/2001 | Lewis ........................ 235/380 | 2003/0046218 A1 | 3/2003 | Albanese et al. |
| 6,227,447 B1 | 5/2001 | Campisano | 2003/0097335 A1 | 5/2003 | Moskowitz et al. |
| 6,233,566 B1 | 5/2001 | Levine et al. | 2003/0105641 A1 | 6/2003 | Lewis |

| | | | |
|---|---|---|---|
| 2003/0163415 | A1 | 8/2003 | Shanny et al. |
| 2003/0208421 | A1 | 11/2003 | Vicknair et al. |
| 2003/0208441 | A1 | 11/2003 | Poplawski et al. |
| 2003/0217005 | A1* | 11/2003 | Drummond et al. ........... 705/43 |
| 2003/0225663 | A1 | 12/2003 | Horan et al. |
| 2003/0233305 | A1 | 12/2003 | Solomon |
| 2004/0078328 | A1 | 4/2004 | Talbert et al. |
| 2005/0033690 | A1 | 2/2005 | Antognini et al. |
| 2005/0119969 | A1 | 6/2005 | Michelsen et al. |
| 2006/0191999 | A1 | 8/2006 | Stoutenburg et al. |
| 2006/0277144 | A1 | 12/2006 | Ranzini et al. |
| 2007/0187484 | A1 | 8/2007 | Cooper et al. |
| 2008/0195541 | A1 | 8/2008 | Battaglini et al. |
| 2008/0203150 | A1 | 8/2008 | Royce-Winston et al. |
| 2008/0210752 | A1 | 9/2008 | March |
| 2008/0215487 | A1 | 9/2008 | Stoutenburg et al. |
| 2009/0265272 | A1 | 10/2009 | Dill et al. |

FOREIGN PATENT DOCUMENTS

| | | |
|---|---|---|
| EP | 421808 | 4/1991 |
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |
| WO | WO 2006/013218 | 2/2006 |

OTHER PUBLICATIONS

Annual Report Pursuant to Sectin 13 or 15(d) of the Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest document ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol., 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

Lamond, Keith, Credit Card Transaction Real World and Online, http://www.virutalschool.edu/mon/ElectronicProperty/Klamond/credit_card.htm, pp. 1-17, printed Jul. 8, 2005.

Dialog file 20, #10279554.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProOuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, and Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

* cited by examiner

PERSONALIZED BANK TELLER MACHINE

CROSS REFERENCE TO RELATED APPLICATIONS

This application is a continuation-in-part of U.S. patent application Ser. No. 10/266,838, filed on Oct. 7, 2002 and entitled "Web Enabled Bank Teller Machine," which claims priority to U.S. Provisional Application No. 60/327,517, filed on Oct. 5, 2001, and the entirety of both of which are incorporated herein by reference.

FIELD OF THE INVENTION

The present invention generally relates to automated banking machines and more particularly relates to an automated banking machine that is dynamically updated from a host system.

BACKGROUND OF THE INVENTION

Automated banking machines are well known. A common type of automated banking machine used by consumers is an Automated Teller Machine (hereinafter "ATM"). ATMs enable customers to carry out a variety of banking transactions by interacting with the machine rather than a human teller. Examples of banking transactions that are commonly carried out using ATMs include withdrawals, deposits, transfer of funds between accounts, payment of bills, and account balance inquiries. The types of transactions that a customer may carry out at a particular ATM are determined by hardware and software configuration of that particular ATM as well as the hardware and software configuration of the institution to which the particular ATM is connected. Other types of automated banking machines may allow customers to charge against accounts, or print or dispense items of value such as statements, coupons, tickets, wagering slips, vouchers, checks, food stamps, money orders, scrip or travelers checks.

The architecture of prior art ATMs renders these machines extremely inflexible. Current ATM architecture is based on traditional hierarchical software and a closed system. Most significantly, the functionality offer through an ATM is fixed at the time the ATM is physically installed or physically visited for purposes of upgrading the machine. The software used for the operation of the ATM is typically contained in firmware installed in the machine, which is fixed and difficult to upgrade. Furthermore, when in operation, the ATM acts primarily as a "dumb" terminal to the remote host (i.e., the financial institution). Little if any logic related to a customer's session with the ATM is contained within the ATM, but is rather stored and executed at the host site. This traditional approach to ATM design and operation results in long development time, increased time to market, inflexible and expensive upgrades, inflexible user functionality, inflexible user interfaces and inordinate dependency on hardware and software developers.

Prior art ATMs are typically connected to proprietary communications networks in order to allow customers to use ATMs provided by those other than its own financial institution. These networks interconnect the ATMs operated by financial institutions and other entities. Some examples of these networks include the NYCE™ and STAR™ systems. The interconnection capability of these networks enables a user to access his accounts at his own financial institution while using a banking machine operated by different institution. This interconnection capability is available so long as the foreign institution's banking machine is connected to a network (e.g., NYCE™ to which the user's home financial institution is also connected. When using such a "foreign" ATM, the user is limited to the transaction options provided by the foreign institution and the options available at the specific ATM being used.

A customer may encounter difficulties when using a foreign institution's ATM. Such difficulties may occur because the user is not familiar with the type of machine operated by the institution. Customer confusion may result because the customer does not know which buttons or other physical mechanisms are required to be actuated to accomplish the desired transactions. Furthermore, the transaction flow (e.g., the series of menu options) presented to a customer at a foreign institution's machine may be significantly different from the machines with which the customer is familiar at the user's institution. This is a problem particularly when the user is from another country and is not familiar with the type of banking machine or the language of the interface provided by the (truly) "foreign" institution. Likewise, the documents, that are generated by the ATM printer, are generally limited to a limited group of defined formats in a single language (e.g., English). Further, the user may be presented with options that are inappropriate for the user's accounts.

A foreign institution's ATMs may also provide more, less, or a different type of transaction than the user is familiar with at their home institutions ATMs. For example, the ATMs at the user's home institution may enable the transfer of funds between the user's accounts. This particular transaction enables the user to maintain funds in higher interest bearing accounts until they are needed. If the foreign institution does not provide this capability, the user will be unable to perform this familiar (and sometimes necessary) function when operating the foreign ATM machine. The inability of a user at a foreign machine to conduct the transactions to which they are accustomed may present problems (e.g., transferring funds into a checking account prior to a scheduled automatic withdrawal.

A foreign institution's ATM also lacks the ability to market directly to the user. For example, the foreign institution's ATM may provide functions, services or products which are not available at the user's home institution.

The need to use an ATM card to access an ATM is a further disadvantage of a "dumb terminal" type ATM because it limits the ability to give users access on a temporary basis or to tailor the access to particular functions based on the user. Additionally, card-less access to some display only functions of the ATM is not currently available on personal devices such as cell phones, PDA's, etc.

Communication over wide area networks enables messages to be communicated between distant locations. The best known wide area network is the Internet, which can be used to provide communication between computers throughout the world. In the past, the Internet has not been widely used for financial transaction messages, as it is not inherently a secure system. Messages intended for receipt at a particular computer address may be intercepted at other addresses without detection. Because the messages may be intercepted at locations that are distant in the world from the intended recipient, there is potential for theft and fraud.

Approaches are being developed for more secure transmission of messages on the Internet. Encryption techniques are also being applied to Internet messages. However, the openness of the Internet has limited its usefulness for purposes of financial messages, particularly financial messages associated with the operation of automated banking machines.

Messages in wide area networks may be communicated using the Transmission Control Protocol/Internet protocol ("TCP/IP"). U.S. Pat. No. 5,706,422 illustrates an example of a system in which financial information stored in databases is accessed through a private wide area network using TCP/IP messages. The messages transmitted in such networks, which use TCP/IP, may include "documents" (also called "pages"). Such documents are produced in Hypertext Markup Language ("HTML") which is a reference to a type of programming language used to produce documents with commands or "tags" therein. The tags are codes, which define features and/or operations of the document such as fonts, layout, imbedded graphics, and hypertext links. HTML documents are processed or read through use of a computer program referred to as a "browser." The tags tell the browser how to process and control what is seen on a screen and/or is heard on speakers connected to the computer running the browser when the document is processed. HTML documents may be transmitted over a network through the Hypertext Transfer Protocol ("HTTP"). The term "Hypertext" is a reference to the ability to embed links into the text of a document that allow communication to other documents, which can be accessed in the network.

As shown in FIG. 1, an ATM 2 communicates with a host processor 6 across a network 4. The host processor 6 is operated by the institution responsible for the operation of the ATM 2, typically a financial institution (i.e., a bank). Although not shown, multiple ATMs can be connected to the host 6 through the network 4. Furthermore, multiple hosts can be connected to the network 4 to service the multiple ATMs. ATM 2 is capable of performing self-testing and notifying the host 6 when a problem is detected, e.g., no cash, no receipt, or no deposits. In response to such a notification from the ATM 2, the host 6 modifies its control of the ATM's display so that a user will be aware of an existing problem or limited service available at the malfunctioning ATM 2.

To use the system shown in FIG. 1, a user first presents a bank card to the card reader that is part of the ATM machine 2. The card typically has a magnetic strip containing user data. The user is then prompted to enter a personal identification number ('_PIN"). The ATM 2 then communicates across the network with the host 6. The user's account information is pulled and transmitted to the ATM 6. Using this prior art system, no customer specific information reaches the ATM until after the user has entered its PIN.

SUMMARY OF INVENTION

In accordance with an exemplary embodiment of the present invention, a system and method is provided for an automated teller machine (ATM). In accordance with an exemplary embodiment of the present invention, a system and method is provided for an ATM having a display, a logic server coupled to the display, and a memory coupled to the logic server. Logic server dynamically modifies the functions presented to the user in response to the profile. The memory, which is accessible to the logic server, contains a profile of at least one user.

In use, the ATM detects a user's card. The card may be detected and read by any suitable means including optical recognition or electric or magnetic field or transmitted signal, etc. After detection, the ATM requests a profile of the user whose card was detected. The ATM then receives the user's profile and stores the user's profile in the ATM. The profile is stored in a memory accessible to the logic server. The functions presented to the user are modified in response to the profile.

The ATM is part of a larger banking system. The system includes a host, an ATM unit, and a network coupled to the host and ATM. The ATM has a display, a logic server coupled to the display and a memory. The logic server controls the content of screens to be displayed on the display, and the memory contains a profile of at least one user. communicate with each other over the network. The ATM and the host communicate with each other over the network. The ATM requests user profiles from the host. The host provides the profiles to the ATM over the network. The profiles are then stored at the ATM in a memory.

The host may be available to a personal device having a transmitter and a receiver. The host transmits financial information to the user based on a request received from the user via the personal device.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 2:
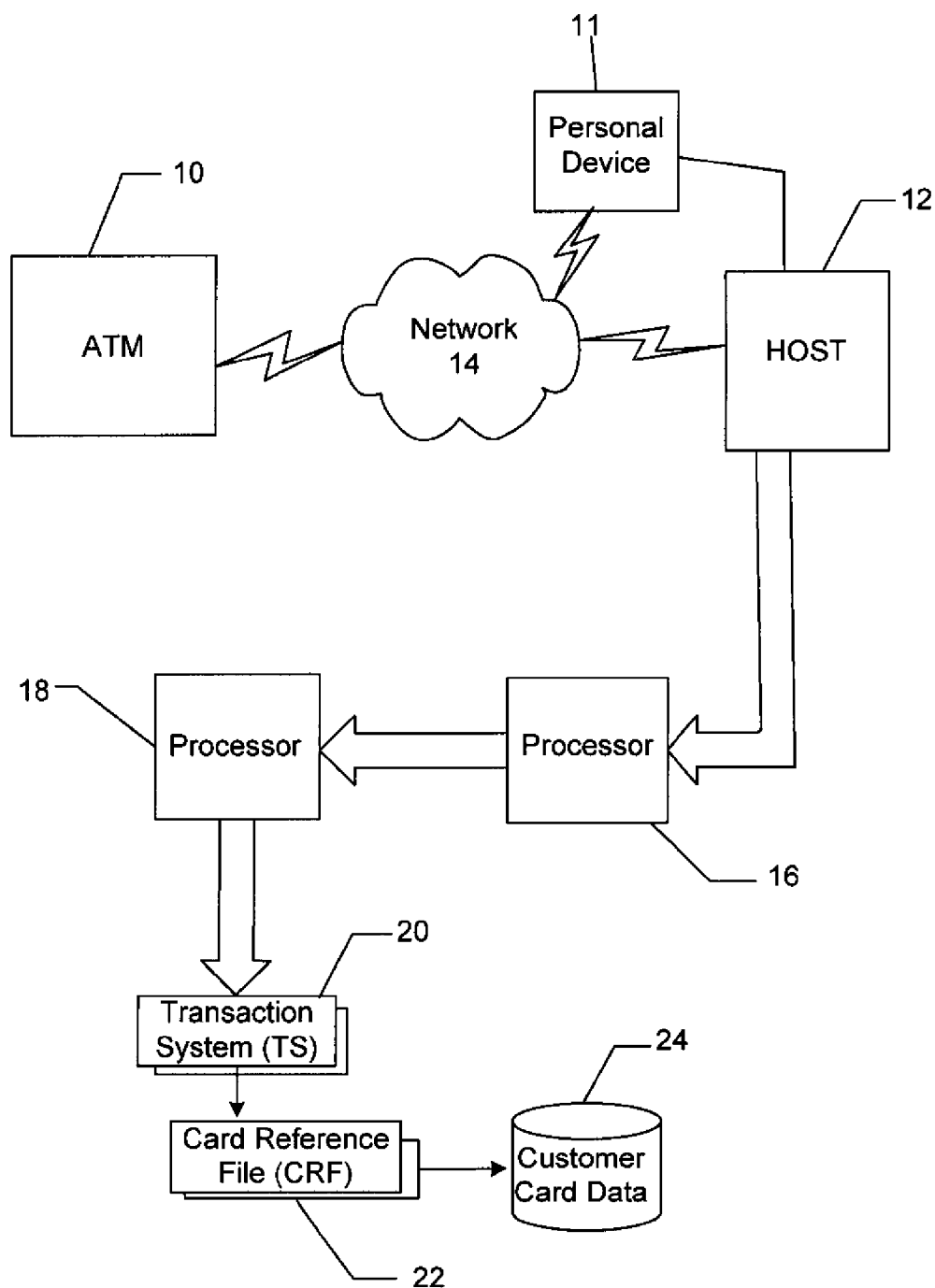
FIG. 2 is a depiction of a system according to one embodiment of the invention.

FIG. 2 depicts the technical framework in which a ATM 10 operates in accordance with the present invention. The overall system comprises the ATM 10 that is connected to a host 12 across a network 14. Host 12 stores a user's profile, i.e., fast cash preference, language preference, frequently used functions, special queries, last couple of uses, activity of children or others who have an associated account, gas pump information and the like. Further, a host 12 can authorize withdrawals up to a specified limit when a user's account data is unavailable or inaccessible. Network 14 can be a proprietary virtual private network, a DSL system, an ISDN network, T-1 lines, the Internet, and the like. The host 12 is connected to a delivery processor 16 that hosts middleware applications.

Delivery processor 16 performs routing and reformatting functions. Delivery processor 16 acts as a transaction switch, interfacing the host to the account system files. The delivery processor 16 is in turn connected to the processor 18. Processor 18 controls access to profile data. Information stored under the control of processor 18 is transferred to the host 12 to be accessed and utilized by the ATM 10. Processor 18 contains a transaction system 20 ("TS") and card reference file 22 ("CRF") applications. The TS 20 and CRF 22 applications interface with the customer card data stored in database 24. ATM 10 may also be a kiosk, point of sale device at a merchant, a self check-out device at a merchant, ticket issuing device at subway or airport, gas pump or other similar kiosk type devices that provides services via a card similar to an ATM.

An optional personal device 11 may be an e-mail device, Personal Digital Assistant ("PDA"), cell phone, blackberry, or other device. Optional personal device 11 may communicate with host processor 6 across network 4 or across any suitable network including a proprietary network associated with optional personal device 11.

ATM 10 is a fully functional ATM in that it can accept deposits, dispense withdrawals, print receipts and statements, and provides a headphone jack for use by sight impaired users. In one embodiment of the present invention, ATM 10 is regulated by fraud and compliance systems operating in a client server environment. In a preferred embodiment, the ATM 10 utilizes an Ethernet TCP/IP telecommunications network 14 between the ATM 10 and Tandem host 12. ATM 10 can also utilize a wireless telecommunications network or any other communication system where messages can be transferred in a secure fashion.

Figure 3:
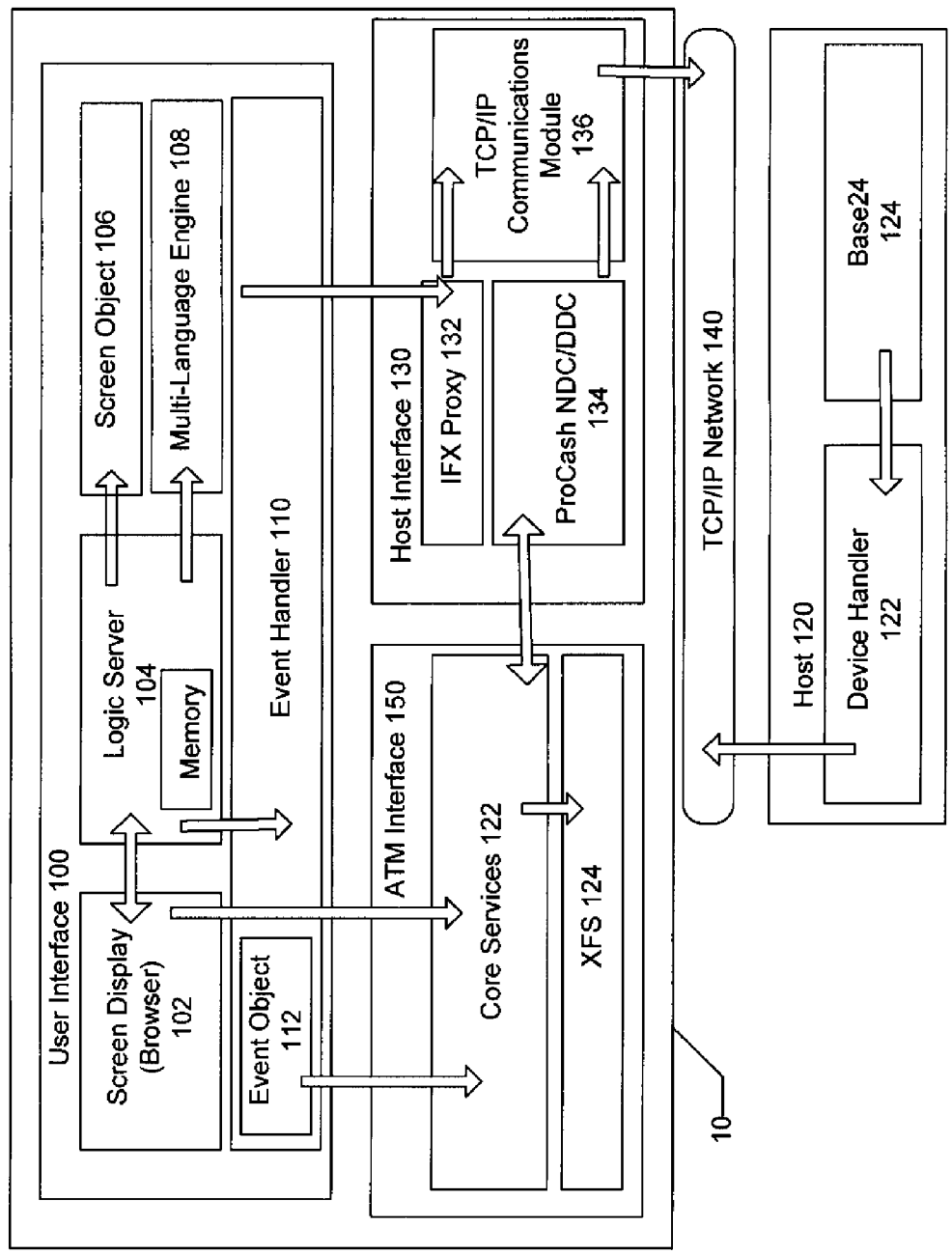
FIG. 3 is an architecture and software overview according to one embodiment of the invention.

FIG. 3 is an architecture and software overview. The major components of the system include a user interface 100, ATM interface 150, a host interface 130, TCP/IP network 140, and host 120.

The user interface 100 is the portion of the ATM 10 which enables a user to conduct various transactions at an ATM both by displaying information to the user as well as responding to the user instructions. Screen 102 displays the transaction options available to a user, displays the user's account information such as balances, displays instructions and in general, displays all of the information required by the user to interact with the ATM 10. As an alternative to the display screen 100, the system of the present invention may interact with the user through aural communication.

A customer may sends host 120 a text message or other digital message from optional personal device 11 requesting their balance or other information. Host 120 receives the message. The message may identify the customer by coming from either a registered address or carrying some information that identifies the customer who sent the message. Based on message identification of the customer, host 120 returns a message to the customer telling customer their balance or other information.

The logic server 104 determines the options made available to the user. Logic server 104 utilizes inputs from screen object section 106, multi-language engine 108, event handler 110, and ATM interface 150 to determine the options to display to the user.

Initially, when a user presents a bank card to the card reader of the ATM 10, the card may be swiped, inserted into a reader, or read by optical, electronic or other suitable means, then a message is sent to the host 120. The host 120 retrieves the customer's profile data (through elements 18, 16, 20, 22, and 24 in FIG. 2) and returns the user's profile to the logic server 104. The user's profile is stored in a memory that can be accessed by the logic server. The user's profile is transmitted as an IFX message in an XML packet. Logic server 104 reviews the customer's unique profile and determines which screen objects 106 to display and what language to use. Various language screens are generated using language engine 108. Depending upon the profile attributes received by logic server 104, i.e., language preference, the PIN entry screen is displayed the language specified by the profile. In a preferred embodiment of the invention, English is the default language. In one embodiment of the invention, the user profiles received by the ATM are stored in a database maintained and updated at the ATM.

In an alternative embodiment, a customer may authenticate or login to ATM 10 machine without an using ATM/Debit card. In this embodiment, money can be sent to a user whereby the user can access the money from ATM 10 without a card. This embodiment can be used with any suitable ATM machine. In another embodiment, an ATM may be accessed for small business deposits without a card. In this embodiment, logic server 104 may serve as an access manager. In this way a lower level employee may make a deposit without giving them a bank card. In another embodiment, access to ATM 10 may be administrable through a PC. In this embodiment, a user may adjust access and functions available for him/herself or for a person designated to have access. For example, the user may set withdrawal limits or enable access for deposits only.

In the transmission from host 120, logic server 104 receives other attributes including account types and rights associated with a given bank card. For example, a bank card for a business may be allowed access to deposits only, so that employees using the card cannot make withdrawals or view balances. The logic server 104 modifies the display and the options available to the user based on the business rules contained therein and the customer specific attributes transmitted from host 120.

The ability of the ATM 10 of the present invention to receive a user's profile is an extremely valuable tool for offering additional services to a user. A user's profile can contain more than an account listing, rights, and balances. The profile can contain a credit rating, recent purchases, i.e., a home, outstanding loans, and the like.

Figure 3A:
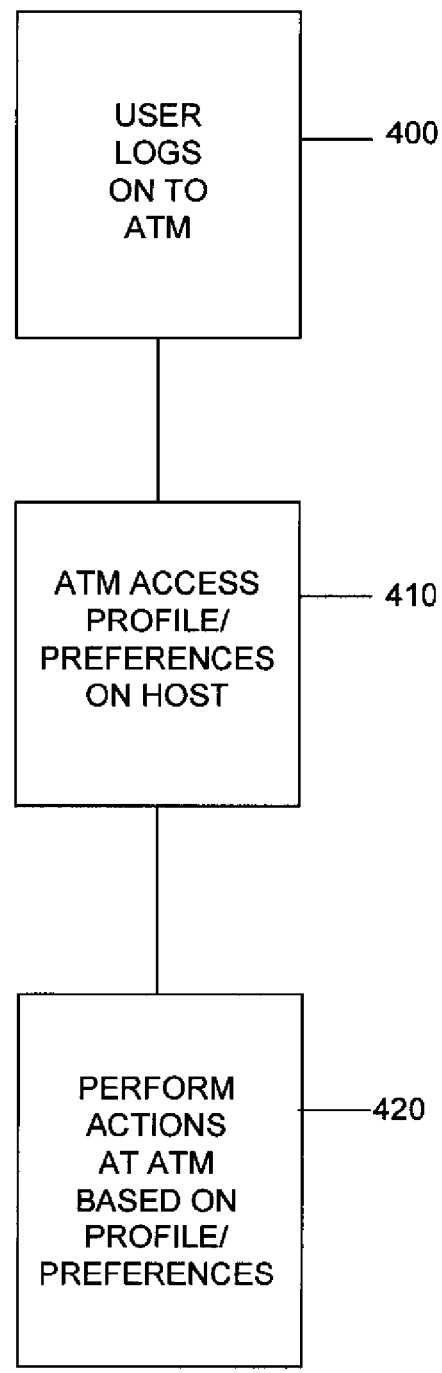
FIG. 3a is a flow chart showing ATM access to a user profile/preferences according to one embodiment of the invention.

FIG. 3a is a flow chart showing ATM access to a user profile/preferences. In an embodiment of the invention, a users preferences may be accessed immediately after the login screen. For example, when the card reader of the ATM 10 detects a users a bank card, a message is sent to the host 120 at step 400. The host 120 retrieves the customer's profile data (through elements 18, 16, 20, 22, and 24 in FIG. 2) and returns the user's profile to the logic server 104 at step 410. The user's profile is stored in a memory that can be accessed by the logic server. The user's profile is transmitted as an IFX message in an XML packet. In an another embodiment, the profile may be stored on the user's card, for example a smart card. In an another embodiment, the profile may be pre-stored on the memory of ATM 10, for example ATM 10 may be the user's home branch ATM which may store profile's for all users whose accounts are associated with that branch.

A users profile may include user preferences. For example, a customer may set preferences to show account summaries for all accounts when the customer logs in. Another preference may cause an ATM to automatically dispense $100 or a convenient preset customer amount, or prompt the user to confirm whether he wants that amount to be dispensed, every time the customer logs in to a specific ATM. Other personal options may be stored and activated upon login in keeping with the present invention.

Logic server 104 can be programmed with a series of business rules to analyze the user's profile and offer additional services. For example, if the user has an overdraft balance and a mortgage, an offer for a second mortgage or refinancing may appear. Similarly, if the user has a large balance in a savings or checking account brokerage or other investment services may be offered.

Logic server 104 can be programmed with a series of business rules to analyze the user's profile and provides coupons, messages ("alerts"), or other information to non-customer users based on the identity of the non-customer's bank. When the user logs on to a bank or other financial institution's ATM system (e.g., to obtain dispensed currency), the ATM 10 may identify the user's home banking institution. A message may be sent to the host 120, which may be a central banking system associated with the bank providing the ATM 10, which causes the host 120 to store a message identifying products or services that are offered by the bank providing the ATM 10 but not offered by the user's home banking institution. The message may be in the form of a grid or table. The message may be displayed to the user at ATM 10 in a manner that clearly conveys the products and services offered by the bank providing the ATM 10. For example, advertisements and other information (e.g., product descriptions) of those identified products and services may be provided to the user via the display at ATM 10. Other messages or alerts based on the users profile may be sent in keeping with the present invention.

In one embodiment, if a Bank that offers overnight payments identifies an ATM, user at an ATM it provides, whose home bank does not offer overnight payments, then the ATM may display a message asking "Does your bank offer overnight payments?" at a logout screen. An incentive to buy a corresponding Bank product or enroll in a corresponding Bank service may also be provided, such as a coupon or discount.

For the embodiments described herein, messages may be provided to the user through any interface provided by the bank or financial institution. For example, the interface may be the Internet, phone, ATM, bank branch, or other communication means. In an embodiment, messages may be displayed at the terminal touch-screen display or coupons may be coupled with a transaction receipt. A receipt may be delivered at an ATM and/or emailed to a customer. Because many users keep receipts for record-keeping purposes, the receipt may comprise a perforation with a detachable coupon.

Figure 3B:
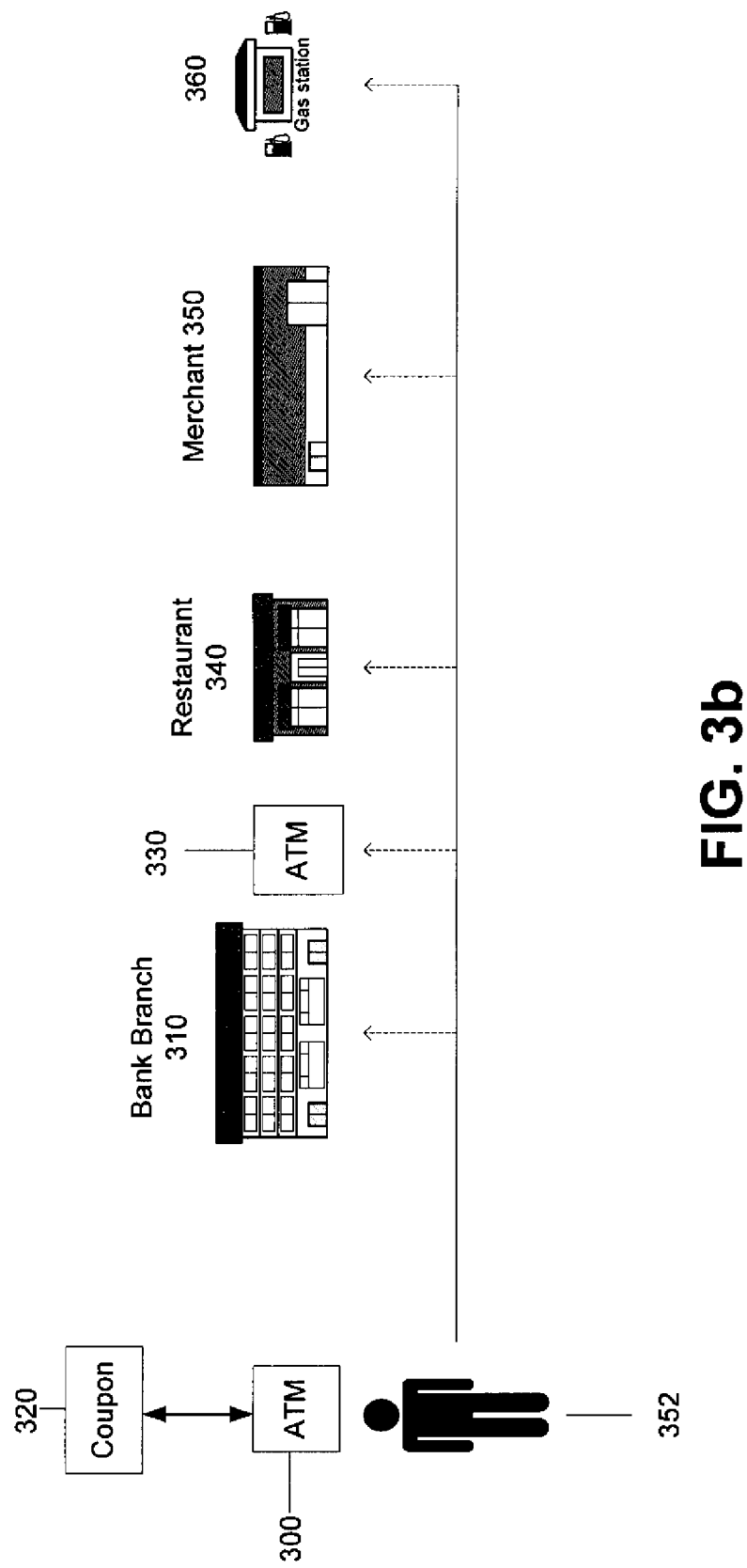
FIG. 3b is a chart showing ATM access by a user in an typical environment according to one embodiment of the invention.

FIG. 3b is a In an embodiment of this invention, a bank may advertise branch products and services by providing coupons or advertisements for those products and services at an ATM 300 located near a particular bank branch 310. For example, a customer who uses the ATM 300 may receive a coupon 320 during an ATM transaction and then walks a short distance to the branch 310 to redeem the coupon 320. Because it is useful to motivate customers to act while they are in the vicinity of the branch 310, coupon 320 may have an expiration date that is relatively soon to ensure speedy redemption. ATM 300 may dispense coupon 320 based on the time of day so that branch-related ads are dispensed only during branch hours.

When a user uses a bank ATM 330 provided by a bank other than its home ATM 300 the transaction usually is accompanied by a corresponding fee. During a subsequent transaction at an ATM 300 or other bank interface provided by the users home bank, a message may be passed to the Bank customer indicating the location of an ATM, for example ATM 300 provided by the users home bank that could have been used instead of the other bank's ATM, for example ATM 330, to avoid the fee. For example, the ATM 300 may display the message: "You paid an unnecessary fee at another bank's ATM. Your Bank has an ATM one block from the ATM that charged you a fee. Next time, use our nearby ATM and avoid the fee." The ATM 300 may also provide a map and directions indicating the corresponding nearby ATM and possibly the other bank's ATM to show the short distance between the two ATM's. In another embodiment, the Bank may identify every fee type and how it may be avoided. For instance, the bank providing the ATM 300 may indicate via a message that upgrading a customer's account would avoid a particular fee.

ATM 300 may be located near or inside a merchant 350 may provide products or services and/or otherwise facilitates sales and marketing associated with merchant 350. In an embodiment of the invention, a customer may browse and purchase nearby merchants products at ATM 300. For example a restaurant patron may order food at ATM 300 and then pick it up at a service counter at restaurant 340. In one embodiment, a customer may use funds associated with their banking card to purchase products associated with merchant 350. In another example, a traveler may print an airline boarding pass and security document at ATM 300, if ATM 300 is near their gate. Many retailers benefit from the existence of ATMs in or near their store because shoppers are more likely to make purchases when they have cash in hand.

In some embodiments of the invention, a partner user interface is combined with an ATM terminal into one multi-purpose terminal (or the two interfaces are located very close to one another). In one embodiment, a gas dispenser at a gas station is combined with an ATM forming an ATM/gas pump 360 so that a gas customer can get cash and pay bills while pumping gas. The ATM/gas pump 360 may also enable the customer to access a gas card account, pay for gas with an ATM card, and access other gas station functions.

Logic server 104 interacts with event handler 110 to process hardware events from the physical portions of the ATM 10. The event handler 110 passes messages to the logic server 104 that relate to the functioning of the ATM. ATM interface 120, and specifically core services portion 122 passes these messages to event handler 110 to provide notification of hardware events to logic server 104. Core services portion 122 constantly monitors the operation of the physical portions ATM 10 (e.g., the cash dispenser, the deposit receiver, the printer). If a portion of the unit malfunctions or the ATM 10 is unable to perform a task, such as dispense cash, a hardware event occurs. This hardware event is provided to the logic server 104, which in conjunction with screen object 106, will remove the "withdrawal" button from the display (for this particular hardware event). In one embodiment of the invention, the display screen will also be modified by logic server 104 to notify users that the ATM 10 is unable to perform a function, such as dispense cash, prior to the user swiping the bank card.

All of the actions taken by logic server 104 are governed by various business rules. Business rules are implemented as programming logic contained within the logic server 104 in the ATM 10. These business rules, in one function, streamline the user's session by eliminating transactions not available to the user. This is a significant departure from prior art ATMs where the same transactions options are displayed at the ATM to every user, and are then denied by the host when it is determined that the requested transaction is not available to the user. With ATM 10 of the present invention, the "intelligence" is available within the ATM 10 itself, to logically control the menu options, such as the buttons and accounts, using business rules logic. As previously described, the predefined business rules interact with the user's unique profile (transmitted to ATM 10) to control the screen and options available to the user. For example, if the user's received profile indicates that card being employed by the user is only authorized to make deposits and not withdrawals, the options for making withdrawals is never presented to the user.

In a preferred embodiment of the present invention, business rules are implemented at a high level control in an Institution Definition File (IDF). In this embodiment of the invention, an IDF is defined for each proprietary card type and is contained in the user's profile associated with the card. In this IDF, there are two attributes or flags available, one to allow PIN Change and one to allow Profile Changes. These parameters are set to a "Yes" or "No" as to whether or not to allow these Pin and Profile change operations.

In general, all customers using the ATM 10 of the present invention have the ability to perform the same transactions that they can perform with the prior art ATMs. In a significant departure from the prior art, however, if a customer was unable to perform a transaction in a prior art ATM (e.g., transfers between accounts because the user only had one account) the ATM 10 of the present invention does not even present that option to the user. For example, if the customers cannot perform account transfers, the ATM 10 never displays the transaction button associated with that function to the user. As previously described, the modification of the selection menus is performed locally by the logic server 104 operating on the predefined business rules and the customer profile.

Figure 4:
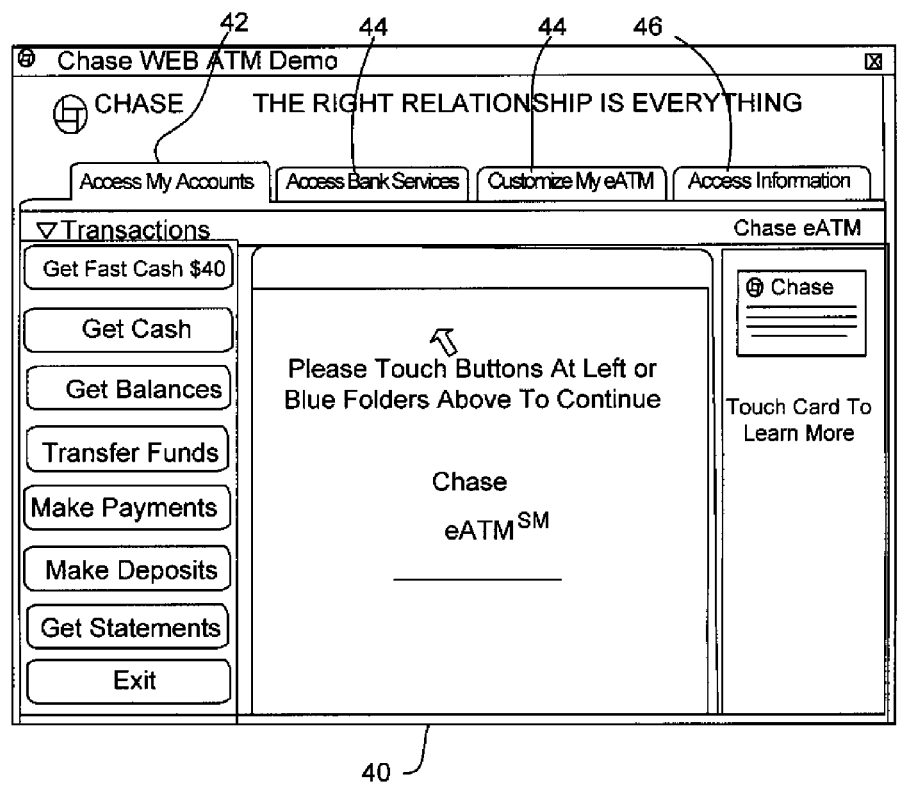
FIG. 4 shows a typical ATM screen according to the invention according to one embodiment of the invention.

FIG. 4 illustrated an example of a preferred ATM screen 40 presented to the user in accordance with the present invention. At the Main screen 40 the following folder tabs are active/available: Access My Accounts 42; Access Bank Services 44; Access Information 46; and Customize My eATM 48. The information displayed is modified as various business rules are executed against the customer's profile. For example, in one embodiment of the present invention, the "Get Fast Cash" button is not displayed when: a proprietary customer does not have a checking account; a customer is using a proprietary credit card; a customer is using a business limited function card (deposit only); customer profile contains a checking account indicator of "deposit only allowed"; or the ATM 10 is unable to dispense cash. As seen above, some of these conditions which cause the displayed options to be modified are found in the customer profile and some relate the physical conditions at the specific ATM 10 being used by the customer.

In another embodiment of the present invention, there are also business rules that determine when the "Get Cash" button is or is not displayed. The "Get Cash" button is not displayed when: a customer is using a business limited function card (deposit only) or when the ATM is unable to dispense cash. Additionally, the accounts that can be displayed are determined by logic server 104 according to predefined rules and the customer's profile. For example, checking accounts are not displayed when a customer is using a proprietary credit card, a customer is using a business limited function card (deposit only), or customer profile returns an account indicator of "deposit only allowed." Similar rules also exist regarding the display of saving accounts and credit accounts. To streamline ATM use, the "Transfer Funds" button is not displayed when the user does not have more than one account or if the user is utilizing a business limited card. Additionally, the display of accounts available for "transfer from" and "transfer to" change in response to the selections that are made by the customer as well as in response to the attributes (i.e., the customer's actual accounts) contained in the user's profile. For example, credit accounts are not displayed as a transfer destination when a user elects to transfer funds from a credit account and a selected account will not appear in both the "transfer from" and "transfer to" categories.

Business rules also exist for the "Make Deposit" and "Get Statement" buttons. The business rules are based on account types, card functionality, card rights, availability of banking institution records, ATM functionality, or status, and the like. As discussed above, if logic server 104 receives a hardware event that a printer is malfunctioning or out of paper, the display items associated with the malfunctioning equipment are not displayed (e.g., Print a Statement).

The ATM 10 of the present invention allows users to customize the ATM 10 features and functionality through their profiles. For example, users can change their PIN, customize the fast cash amount, change the language preference, establish defaults for fund transfers, and the like. Additionally, users can schedule one time and recurring payments through the ATM 10.

When a user customizes a feature of the ATM 10, this data is transferred from the host interface 130 (FIG. 3) across the TCP/IP network 140 to the host 120 where it the customization changes are permanently stored in the customer's profile contained in the database 24. The ATM 10 communicates with host 120 using Interactive Financial Exchange ("IFX") and NDC format commands. However, all communication can be conducted using IFX commands or other command formats. In an another embodiment, optional personal device 11 may communicate with the host via suitable means, for example a wireless network.

IFX is an XML-based communication protocol that enables the exchange of information between financial institutions and their customers, their service providers, and other financial institutions. IFX was initially developed for Internet banking, not for ATM applications. IFX commands are used for PIN change, profile request, and profile preference change. No corresponding commands exist for these functions in the NDC format. Additionally, IFX can be used for withdrawal, balance inquiry, statement, deposit, payment, and transfer commands.

As shown in FIG. 3, to accommodate the IFX command format, the host interface 130 has an IFX proxy module 132 and the host 120 has a corresponding device handler 122. In one embodiment of the invention, device handler 122 translates IFX format commands into Base24, an industry standard program language. The use of IFX allows more complex communication between the host 120 and the ATM 10. The NDC command format does not support interactive commands, as does IFX. Further, IFX has been expanded herein to include such features as profile requests, previously unavailable in an ATM.

Figure 1:
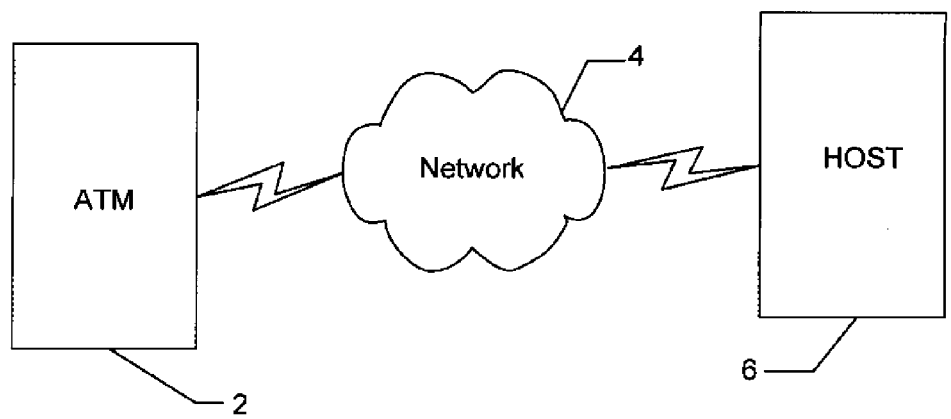
FIG. 1 is a depiction of a prior art system.
Figure 5:
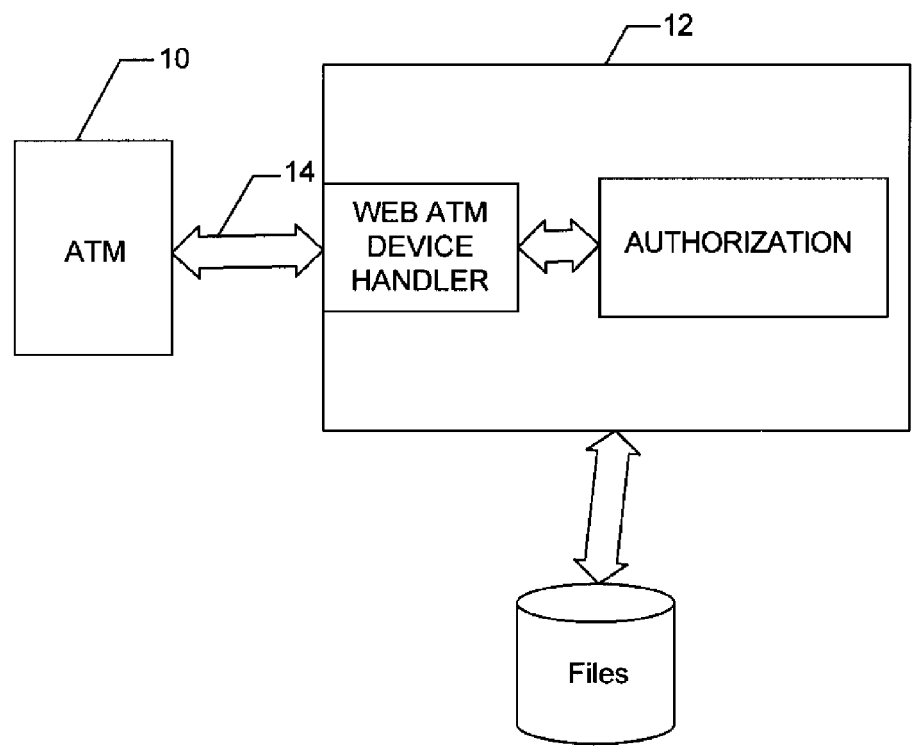
FIG. 5 is a depiction of a system according to one embodiment of the invention.

FIG. 5 is a depiction of a system according to one embodiment of the invention. The ATM 10 communicates with a host 12 to authenticate users. Once a user is authorized, information stored in the host's files is accessible to the ATM 10. The host stores a user's profile, which is updated, as required, by processors 16 and 18. When a user attempts to make a withdrawal, the host 12 will verify funds in the user's account with processor 18. If processor 18 is unavailable host 12 is able to authorize a withdrawal. The amount of the withdrawal is stored and the users account is updated when processor 18 is available. In one embodiment, a user can withdraw a maximum amount without receiving fund availability from processor 18. In one embodiment of the invention, the relevant files regarding a user are transmitted to the ATM including current balances. In this manner, the ATM 10 does not have to constantly seek information from the host 12. After a transaction is completed, the ATM will send a message to the host 12 updating the current account balances. In one embodiment of the invention, only one ATM can access an account at a time to prevent multiple withdrawal of the same funds.

Figure 6:
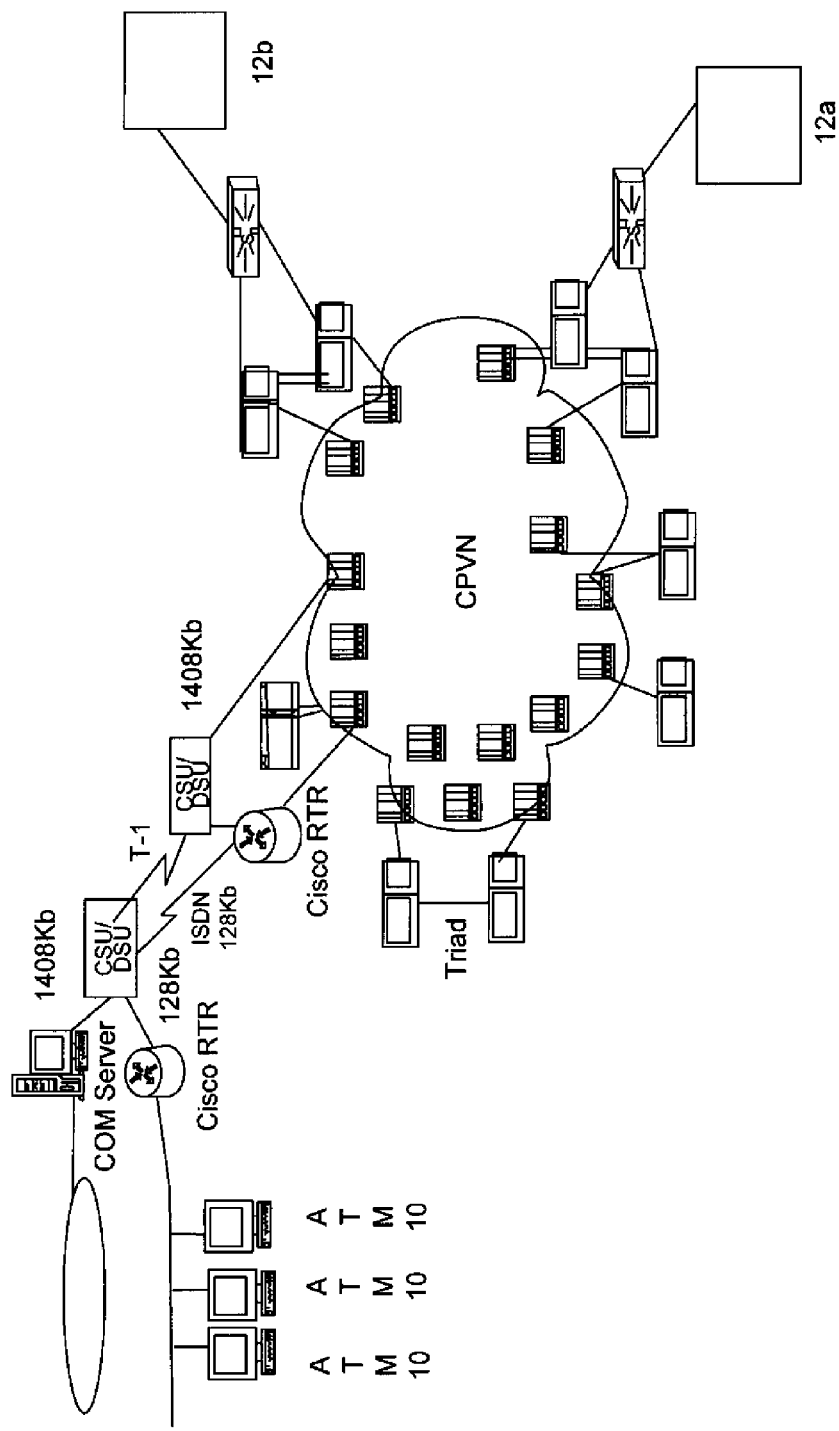
FIG. 6 is a depiction of the network infrastructure according to one embodiment of the invention.
Figure 7:
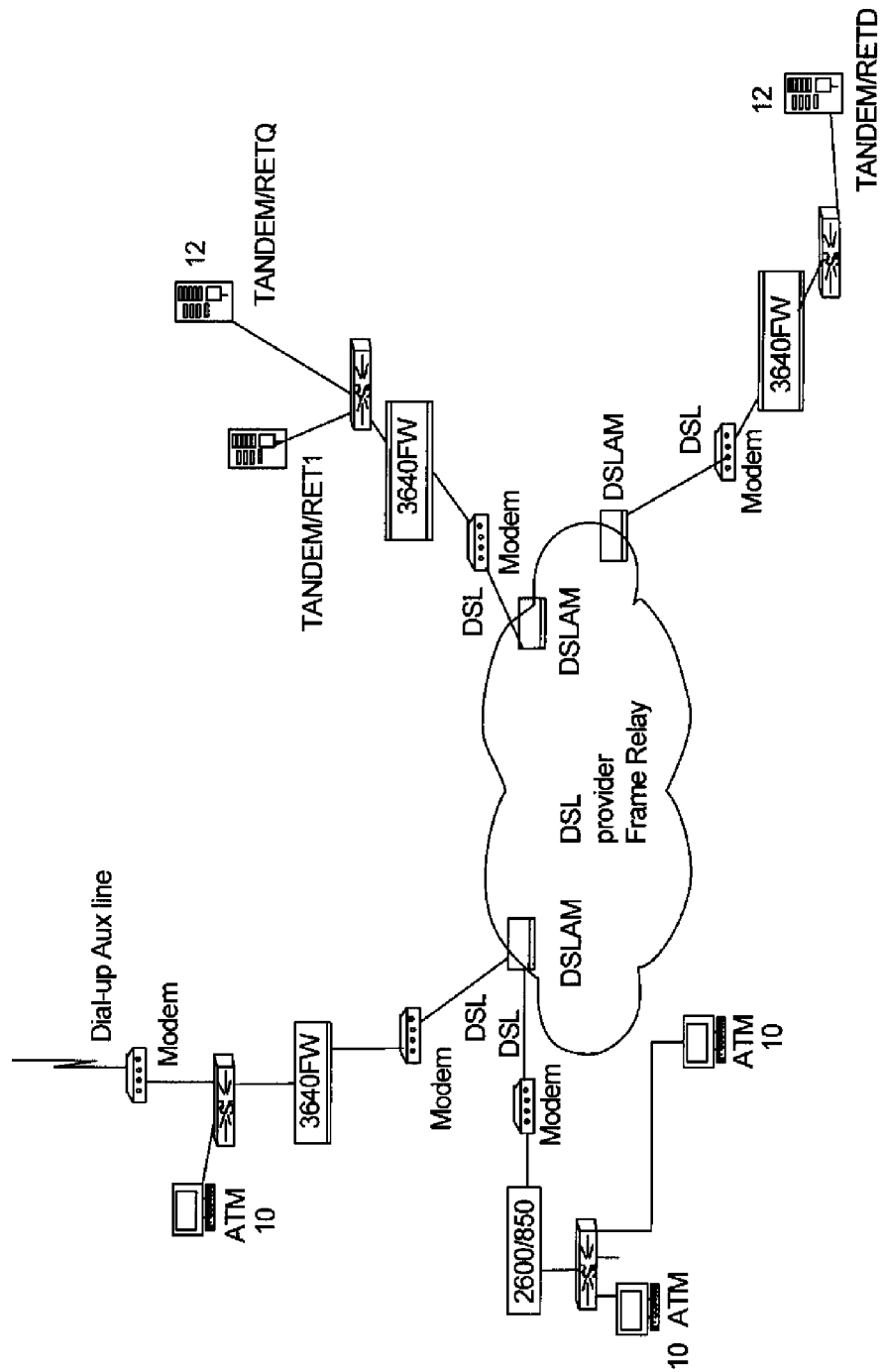
FIG. 7 is a depiction of the network infrastructure according to one embodiment of the invention.
Figure 8:
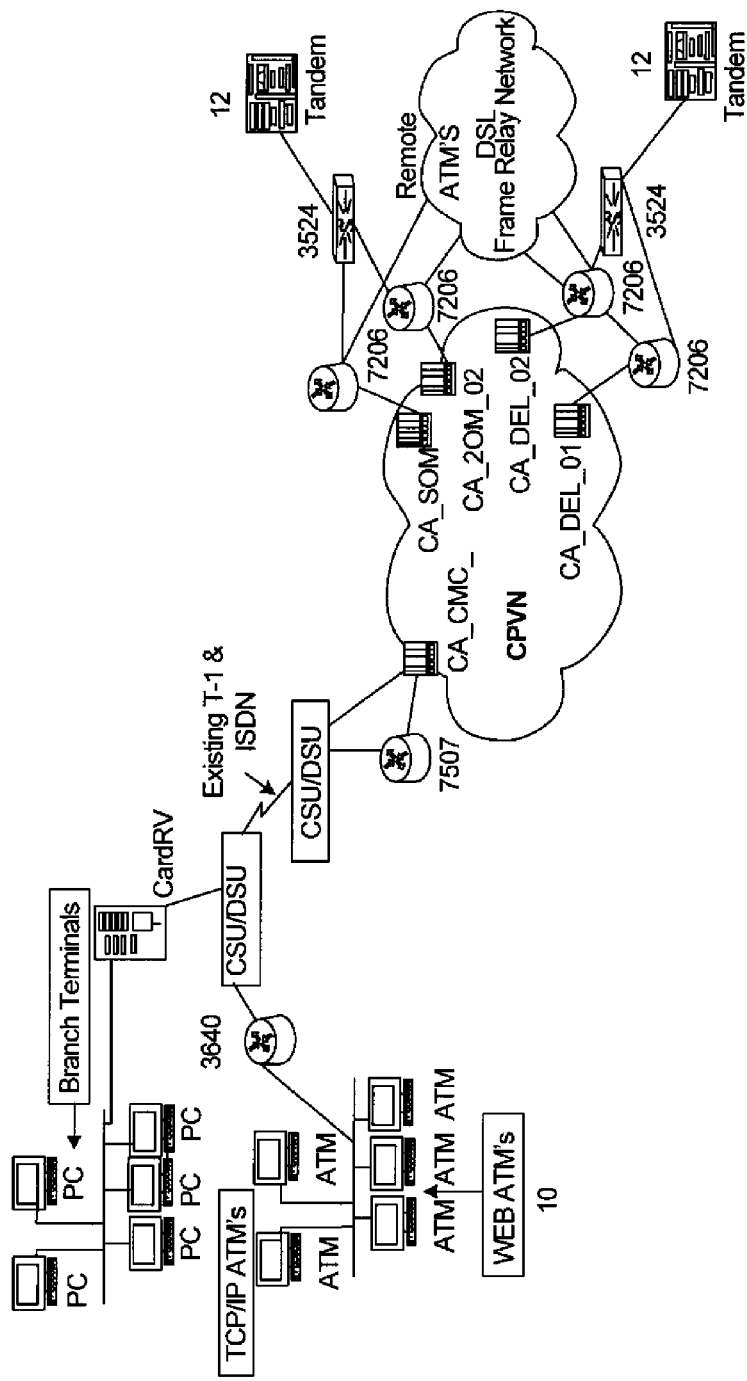
FIG. 8 is a depiction of the network infrastructure according to one embodiment of the invention.
Figure 9:
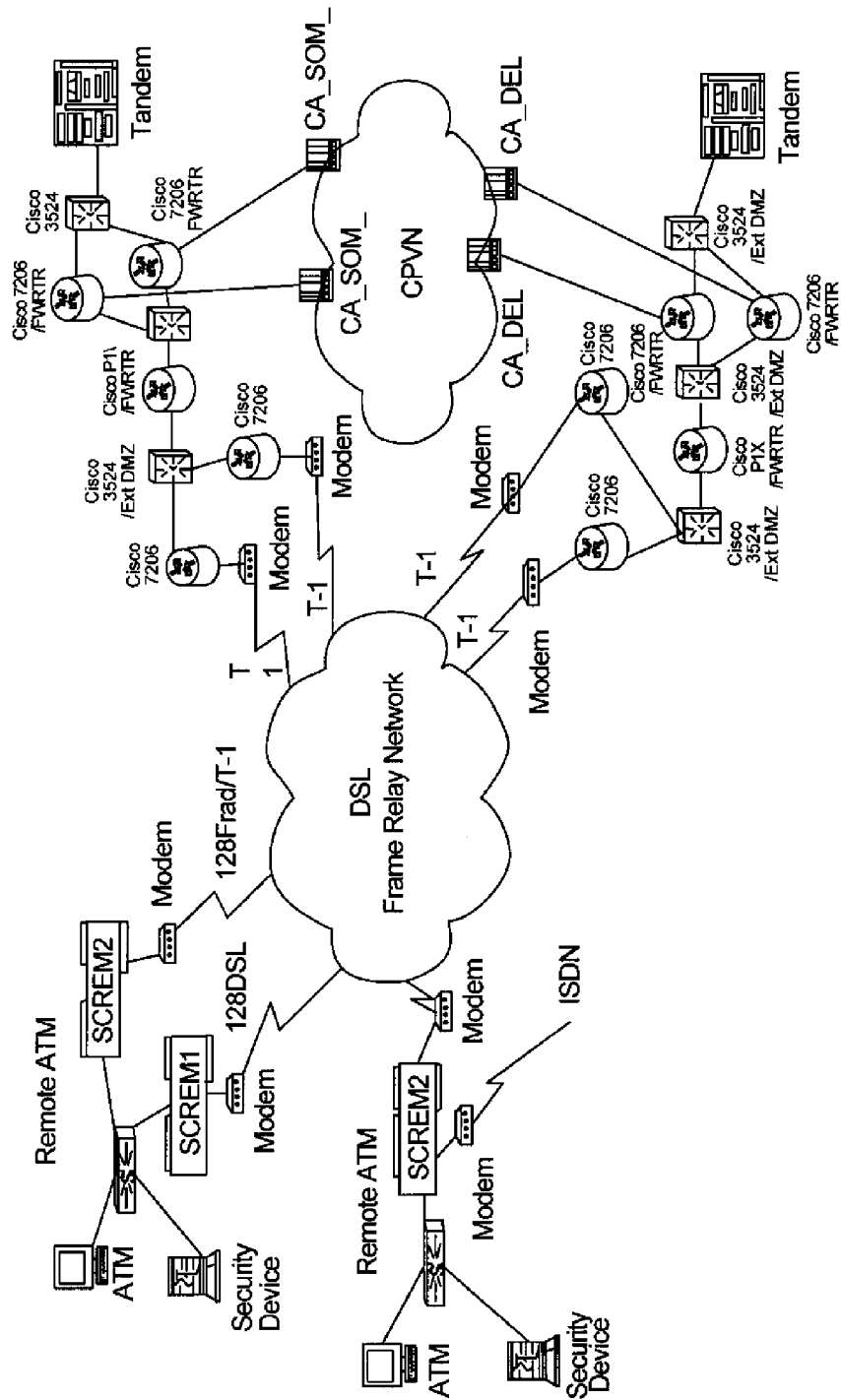
FIG. 9 is a depiction of the network infrastructure according to one embodiment of the invention.
Figure 10:
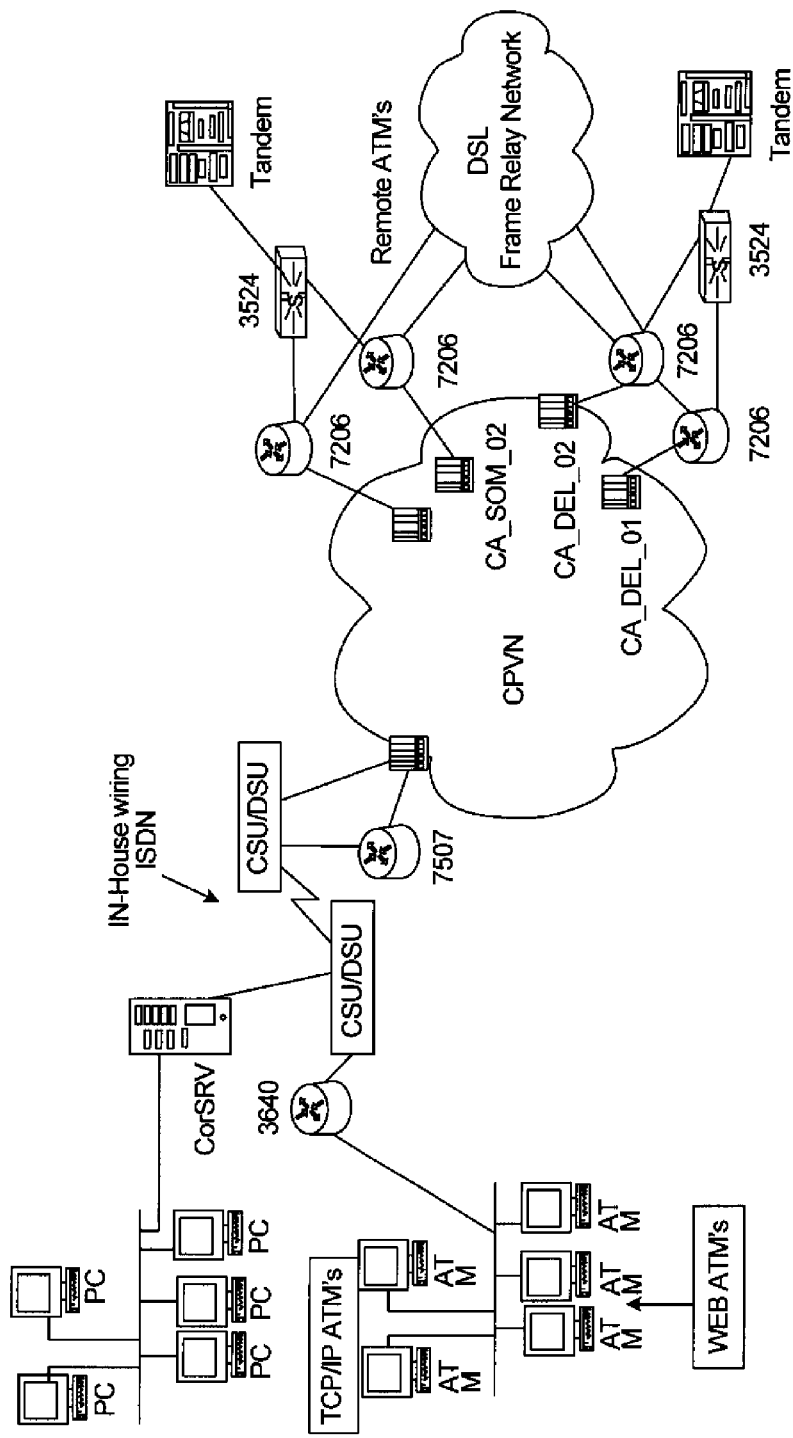
FIG. 10 is a depiction of the network infrastructure according to one embodiment of the invention.
Figure 11:
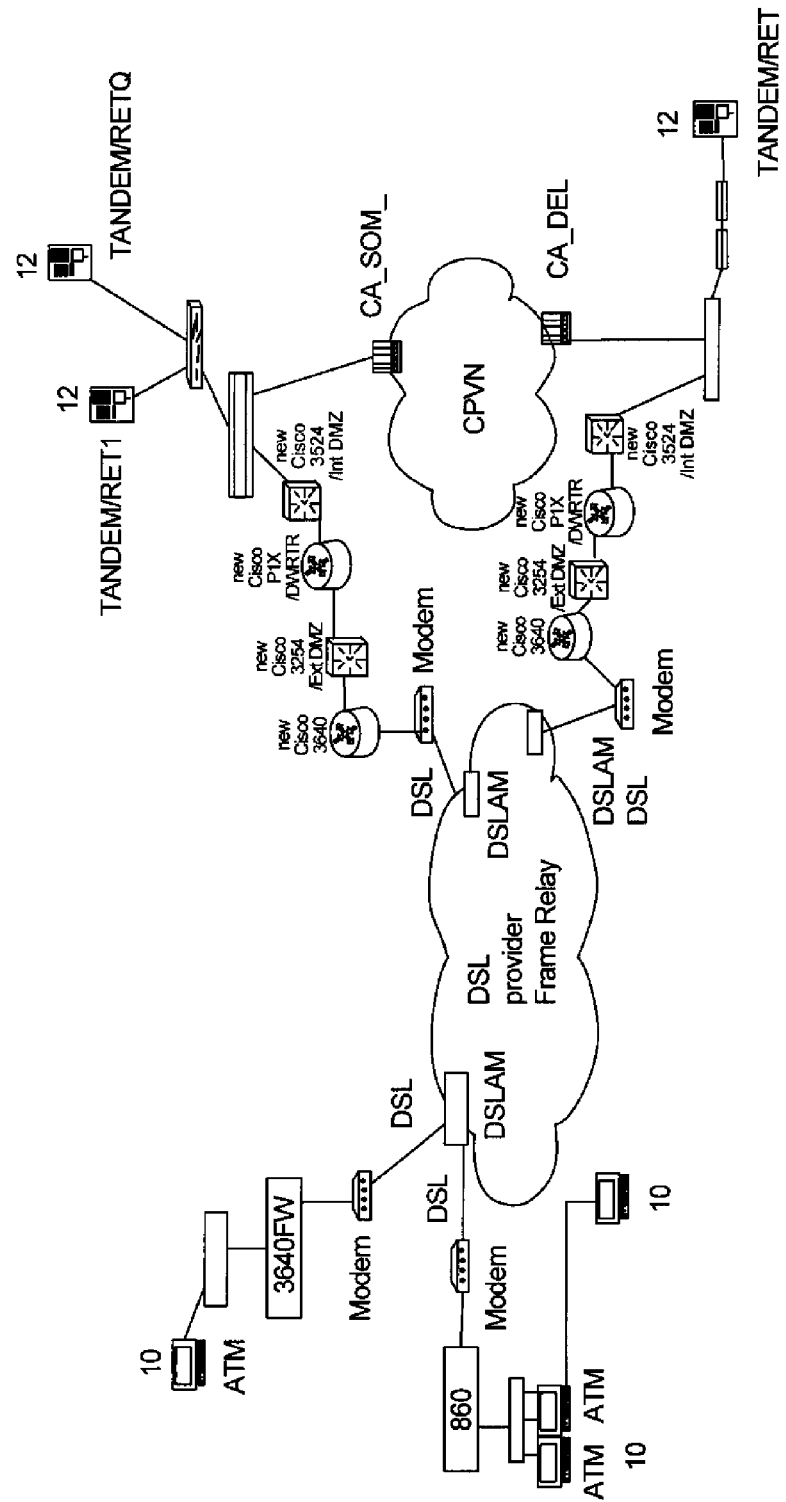
FIG. 11 is a depiction of the network infrastructure according to one embodiment of the invention.

FIGS. 6-11 show the ATM 10 using various network infrastructures. FIG. 6 depicts the ATM 10 coupled to a host 12a or 12b via an Ethernet infrastructure. Each of the ATMs 10 is coupled to a primary host, 12a or 12b. Each ATM 10 is alternately connected to the other host as a back up if the primary host experiences a failure. Further, the ATMs 10 at a single branch or location are not all connected to the same primary host. This insures that if a primary host goes down, the ATMs 10 connected to the other host still function. If a host does go down, the ATMs 10 connected to that host will automatically be routed to their backup hosts. FIG. 7 is a depiction of a network utilizing a remote DSL network infrastructure. The operation of the ATMs 10 in this type of network is essentially the same as those described previously. FIG. 8 is a depiction of a network utilizing a branch Ethernet network infrastructure. FIG. 9 is an alternate embodiment of a remote DSL network infrastructure including a security device. As shown in FIG. 10, the ATMs 10 as well as the branch PCs can utilize the same ISDN network. Finally, FIG. 11 shows another embodiment of a DSL infrastructure.

Figure 12:
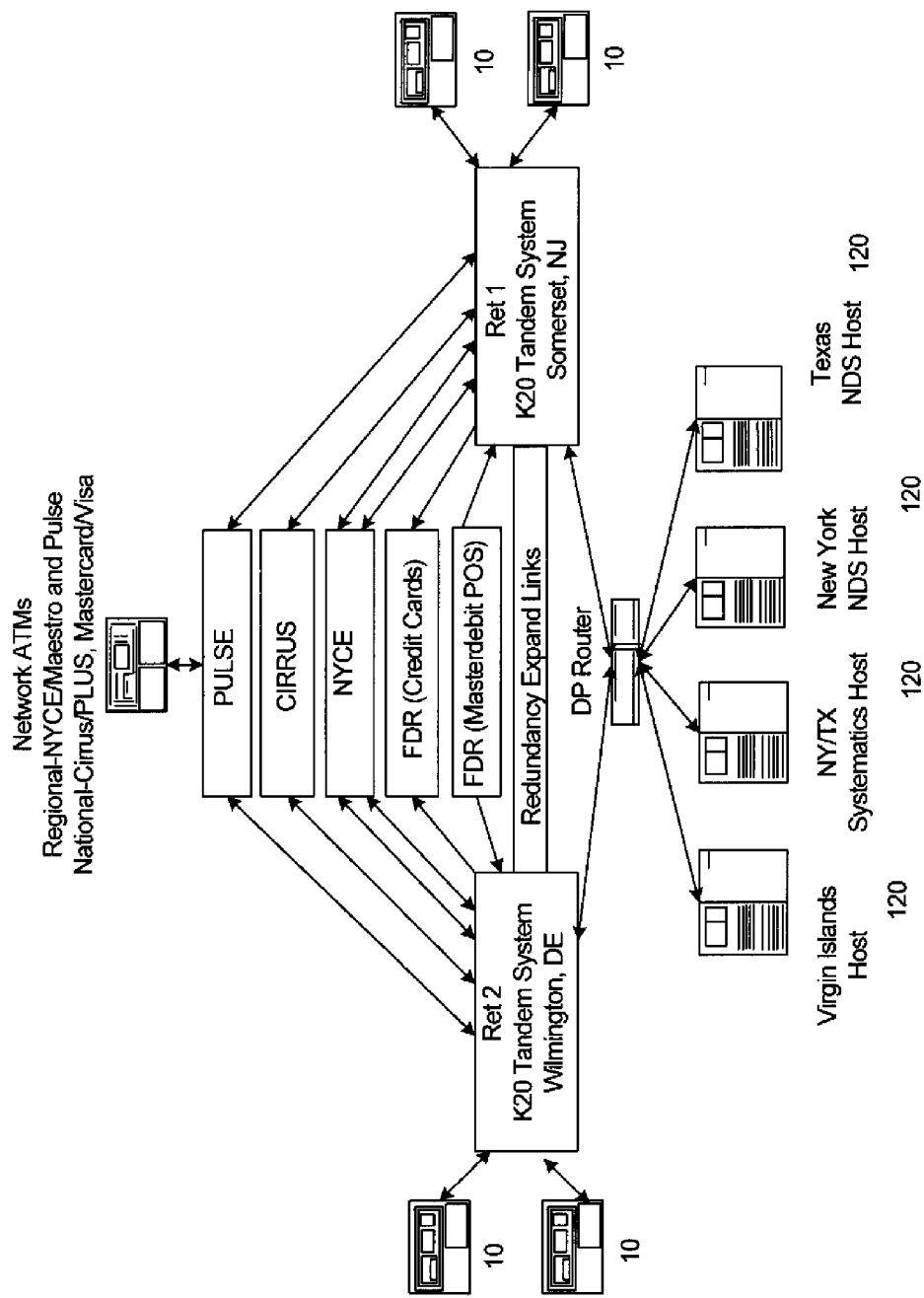
FIG. 12 is a depiction of the system architecture.

FIG. 12 is a depiction of the system architecture. As shown ATMs 10 are coupled to hosts. These hosts 120 are coupled for redundancy and back up purposes. Each host 120 is capable of communicating with other banks via ATM networks such as Pulse, NYCE, Cirrus, and the like. The ATM 10 is able to communicate with the provider's servers, using IFX or another command format, to request user profiles. The Logic server 104 in the ATM 10; is then able to customize the display and service offerings to present the user with a familiar display.

The ATM 10 of the present invention is also capable of operating in a mode for disabled persons, particularly those that are sight impaired ("ADA mode"). A Braille keypad is used for navigation. The ATM 10 enters the ADA mode when a headset is plugged into a headset port of the ATM. The ATM interface 120 (FIG. 3) detects the headset and a hardware event occurs. The hardware event causes the logic server 104 to blank the screen or display a logo or other non-transaction display. Transactions are not displayed for security purposes. The ATM 10 then uses voice commands to relay the information that would normally appear on the screen to the ADA user. The voice commands are either .wav files or synthesized speech. Synthesized speech is used in the preferred embodiment.

When the ATM is in ADA mode, logic server 104 manages the Voice commands in a manner similar to the manner in which screen objects are managed. The logic server 104 selects screen objects using the same business rules as the non-ADA mode. These screen objects are then speech synthesized and presented to the user. In this manner, the messages the user hears are dynamically changed, similar to the way the screen objects are modified in the non-ADA mode.

Figure 13:
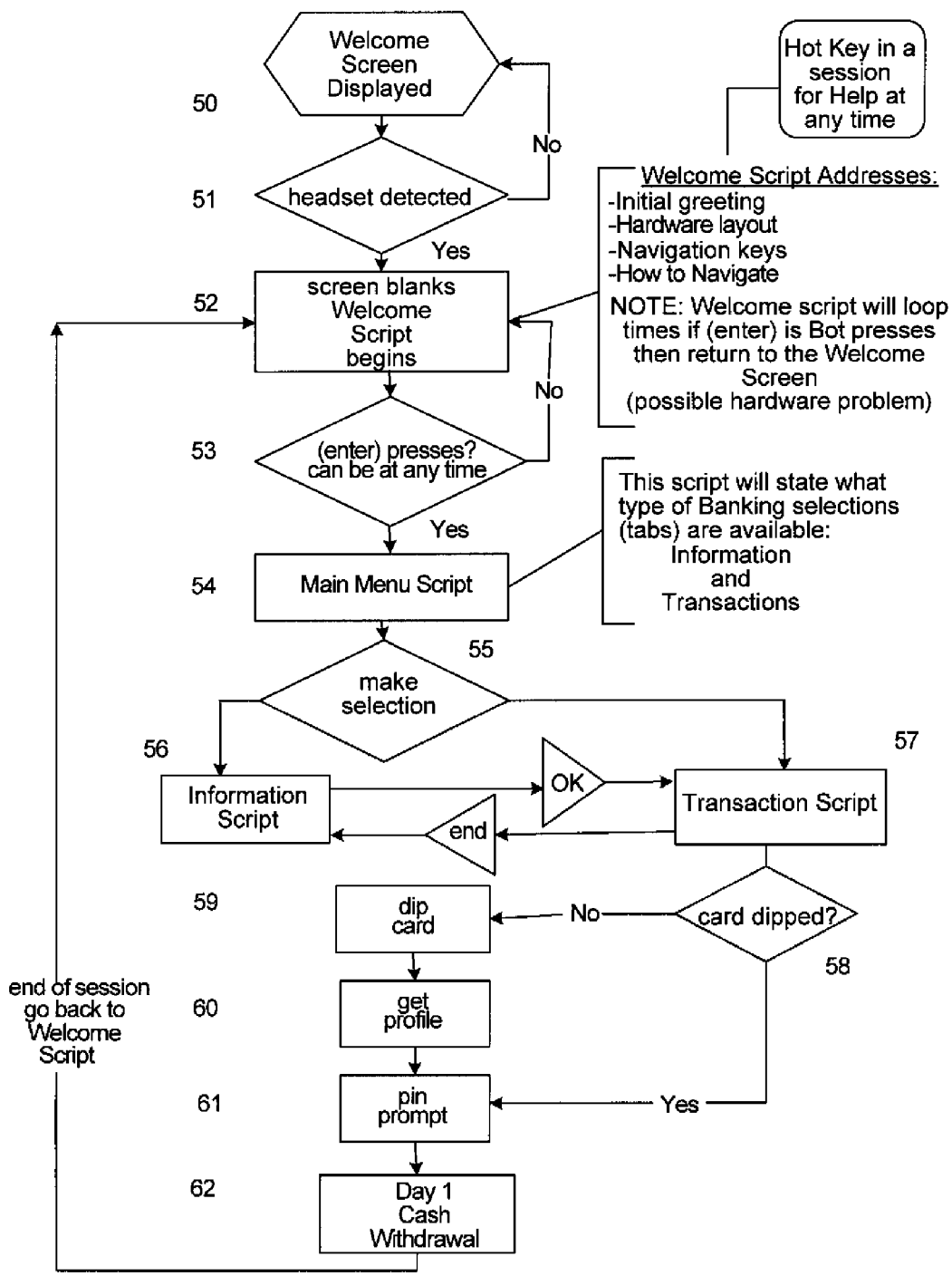
FIG. 13 is a flowchart of a transaction in ADA mode.

FIG. 13 is a flowchart of a transaction in ADA mode. At the outset, the ATM 10 is awaiting a customer, displaying a welcome screen (Step 50). The ATM 10 is constantly monitoring whether a headset is plugged into the ATM 10 (Step 51). Once the headset is detected, the screen is blanked and the ADA welcome begins (Step 52). To enter the ADA mode the user must press enter after the welcome script (Step 53). Once the user presses enter, the system informs the user of the selections available on the main screen and instruct the user on how to make a given selection (Step 54). Using the logic server 104 and a voice synthesizer, the selections an ADA user hears are identical to those presented to a sighted user in the non-ADA mode. The user then makes a selection and presents the bank card for detection (Steps 55-59). Once the card is detected, the user's profile is transmitted and the user is prompted to enter a PIN (Steps 59-61). The user is now able to complete the transaction i.e., make a withdrawal (Step 62). Alternatively, the user can present to card for detection and enter a PIN before plugging in the headset or immediately after plugging in the headset.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A method of operating an Automated Teller Machine (ATM) comprising:
   detecting a user's card at the ATM, wherein the ATM is communicatively coupled to a host through a computer network, wherein the ATM comprises a user interface and a logic server;
   identifying a home bank of the user wherein the home bank of the user is at least one bank or financial institution through which the user maintains at least one account or which provides financial services to the user;
   requesting a profile of the user wherein the user's profile comprises information about the home bank of the user and a set of at least one user selected preference; and
   modifying or personalizing functions presented to the user via the ATM in response to the user's profile wherein the functions presented are modified or personalized based on the home bank of the user and the set of at least one user selected preference.

2. The method of claim 1, wherein the user's profile is received from a host.

3. The method of claim 1, wherein the user's profile is received from the user's card.

4. The method of claim 1, wherein the user's profile is received from a memory operably connected to the ATM.

5. The method as recited in claim 1, further comprising the step of:
   displaying, at the ATM, a message that is based on the home bank of the user.

6. The method as recited in claim 1, further comprising the step of:
   sending a message to the user, wherein the message comprises one or more of the following: Internet message, phone message, email, regular mail.

7. The message as recited in claim 6, wherein the message shows services available from a bank providing the ATM wherein the services in the message are not available from the user's home bank.

8. The ATM as recited in claim 6, wherein the message informs the user of a method of avoiding a fee associated with the ATM.

9. The method as recited in claim 1, further comprising the step of:
   printing a coupon that is based on the home bank of the user.

10. The method as recited in claim 1, further comprising the step of:
    printing a coupon that is based on an associated merchant, wherein an associated merchant is a merchant providing products or services through the ATM, wherein the user can browse, at the ATM, the products or services provided by the associated merchant.

11. The method as recited in claim 1, further comprising the step of:
   displaying an offer for a service that is offered by an associated merchant, wherein an associated merchant is a merchant providing services through the ATM.

12. The method as recited in claim 1, further comprising the step of:
   displaying an offer for a product that is offered by an associated merchant, wherein an associated merchant is a merchant providing products through the ATM.

13. The method as recited in claim 1, further comprising the step of:
   displaying a message identifying products available from a bank providing the ATM but not available from the home bank when the home bank of the user is different than the bank providing the ATM.

14. The method as recited in claim 1, further comprising the step of:
   displaying a message identifying services available from a bank providing the ATM but not available from the home bank when the home bank of the user is different than the bank providing the ATM.

15. The method of claim 1 wherein the user's profile is stored at the ATM.

16. A method of operating an Automated Teller Machine (ATM) comprising:
   logging into the ATM without using a card;
   identifying a home bank of the user wherein the home bank of the user is at least one bank or financial institution through which the user maintains at least one account or which provides financial services to the user;
   requesting a user's profile wherein the user's profile comprises information about the home bank of the user and a set of at least one user selected preference;
   receiving the user's profile at the ATM;
   storing the user's profile; and
   modifying or personalizing functions presented to the user via the ATM in response to the user's profile wherein the functions presented are customized based on information about the home bank of the user and the set of at least one user selected preference.

17. A method of operating an Automated Teller Machine (ATM) comprising:
   detecting a user's card at the ATM, wherein the ATM is communicatively coupled to a host through a computer network, wherein the ATM comprises a user interface and a logic server;
   identifying a home bank of the user wherein the home bank of the user is at least one bank or financial institution through which the user maintains at least one account or which provides financial services to the user;
   requesting a user's profile from the host, wherein the user's profile comprises information about the user, including at least one user selected preference and the home bank of the user;
   modifying or personalizing functions presented to the user at the ATM by the logic server, wherein the functions presented are modified or personalized based on the user's profile;
   identifying products and services available from a financial institution associated with the ATM, wherein the products and services are not available from the home bank of the user; and
   displaying a message that contains the identified products and services.

18. A method of operating an Automated Teller Machine (ATM) comprising:
   detecting a user's card at the ATM, wherein the ATM is communicatively coupled to a host through a computer network, wherein the ATM comprises a user interface and a logic server;
   identifying a home bank of the user wherein the home bank of the user is at least one bank or financial institution through which the user maintains at least one account or which provides financial services to the user;
   requesting a user's profile from the host, wherein the user's profile comprises information about the user, including at least one user selected preference and the home bank of the user;
   modifying or personalizing functions presented to the user at the ATM by the logic server, wherein the functions presented are modified or personalized based on the user's profile;
   displaying one or more products or services associated with a merchant, wherein the user can browse the product or services; and
   receiving a transaction request for purchase of one or more products or services from the user.

19. A method of operating an Automated Teller Machine (ATM) comprising:
   detecting a user's card at the ATM, wherein the ATM is communicatively coupled to a host through a computer network, wherein the ATM comprises a user interface and a logic server and the ATM is associated with a bank or financial institution that differs from a home bank of the user, wherein the home bank of the user is at least one bank or financial institution through which the user maintains at least one account or which provides financial services to the user;
   identifying the home bank of the user;
   requesting a user's profile from the host, wherein the user's profile comprises information about the user, including at least one user selected preference and the home bank of the user; and
   modifying or personalizing functions presented to the user at the ATM by the logic server, wherein the functions presented are modified or personalized based on the user's profile.

* * * * *